Figure 1:
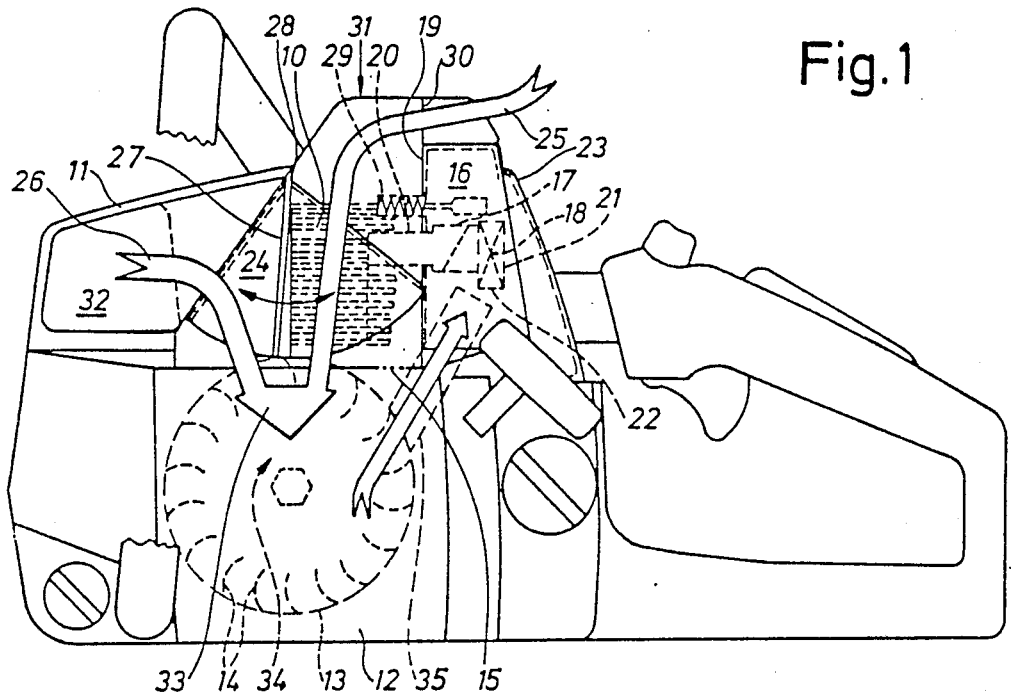

United States Patent [19]

Henriksson et al.

[11] Patent Number: 4,716,860
[45] Date of Patent: Jan. 5, 1988

[54] ARRANGEMENT FOR INLET OF COOLING AND COMBUSTION AIR

[75] Inventors: Sören N. Henriksson, Kållered; Lars-Olof Kärreman, Lerum, both of Sweden

[73] Assignee: AB Electrolux, Sweden

[21] Appl. No.: 829,831

[22] Filed: Feb. 10, 1986

[30] Foreign Application Priority Data

Feb. 13, 1985 [SE] Sweden .............................. 8500666

[51] Int. Cl.⁴ .............................................. F01P 7/02
[52] U.S. Cl. .............................. 123/41.05; 123/41.58; 123/556
[58] Field of Search ..................... 30/381–387; 123/41.58, 41.59, 41.65, 41.66, 41.05, 556

[56] References Cited

U.S. PATENT DOCUMENTS 3,166,052  1/1965  Parsons ................... 123/41.65 X
4,370,855  2/1983  Tuggle .................... 123/41.65 X Primary Examiner—Douglas D. Watts
Attorney, Agent, or Firm—Alfred E. Miller

[57] ABSTRACT

The air inlet of the cooling fan is positioned substantially on top of a motor saw body so that the air is drawn from a region above the saw where the concentration of pollutants is considerably lower than at the usually known inlet through the fan cover. The air inlet is positioned at a distance from the fan cover to provide a connecting channel between the inlet and the fan wheel, in which channel a shunt damper is arranged. The shunt channel enables a balanced mixture of cold outdoor air and warm recirculating inner air so that a proper engine temperature can be effected.

6 Claims, 3 Drawing Figures

ARRANGEMENT FOR INLET OF COOLING AND COMBUSTION AIR

The present invention relates to an arrangement for the inlet of cooling and combustion air in a motor saw.

In previously known embodiments of motor saws the air inlet to the cooling fan of the saw is positioned in one side of the saw body near the ground, where the concentration of sawdust, oil-smoke and sand and snow raked up from the ground during certain moments is high. This will cause a pollution of the cooling fins of the cylinder which impairs the cooling and makes it necessary to clean the engine often if problems with overheating are to be avoided.

In order to make an engine work well it is necessary, in winter time, to preheat the air to the carburetor to decrease condensation water in the crankcase and ice-formation in the nozzle of the carburetor. It is thus known to use heated outlet air from the cooling system of the engine but there is a disadvantage in the form of pollutants which fill up the filter or lead to a high degree of vapor of snow and water in moving parts, e.g. controls which then get frozen fast therein.

The object of the present invention is to eliminate these disadvantages by the arrangement of a common air inlet substantially in the top of the saw body, where the air is drawn from a range above the saw where the concentration of pollutants is considerably lower than at the usually known inlet through the fan cover. Due to the fact that the air inlet is positioned at a distance from the fan cover a connecting channel is created between the inlet and the fan wheel in which channel a shunt damper is arranged. The shunt damper enables a balance mixture of cold outdoor air and warm recirculating cooling air so that a proper engine temperature can be effected.

Figure 2:
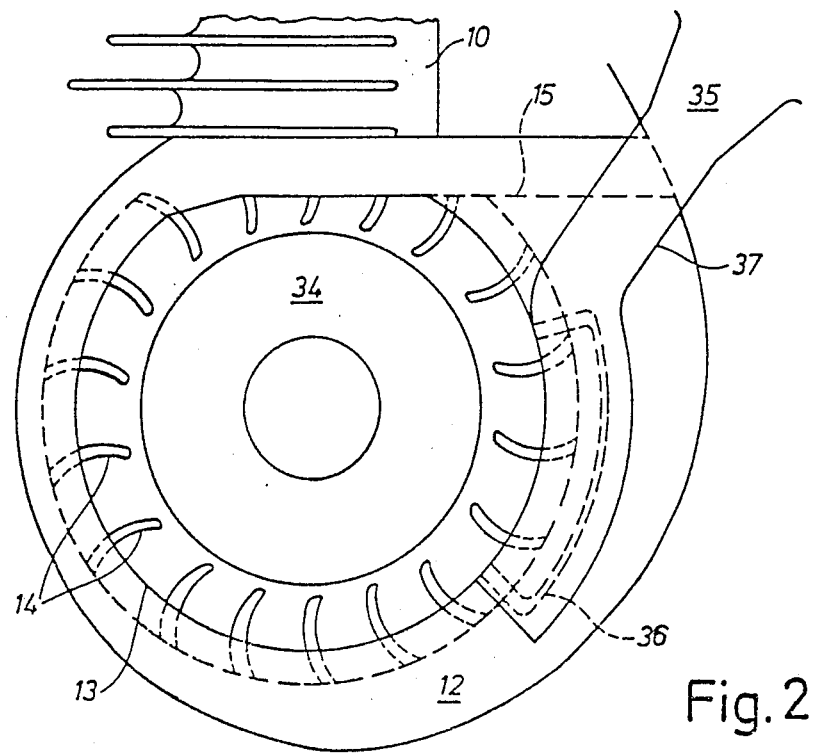
Figure 3:
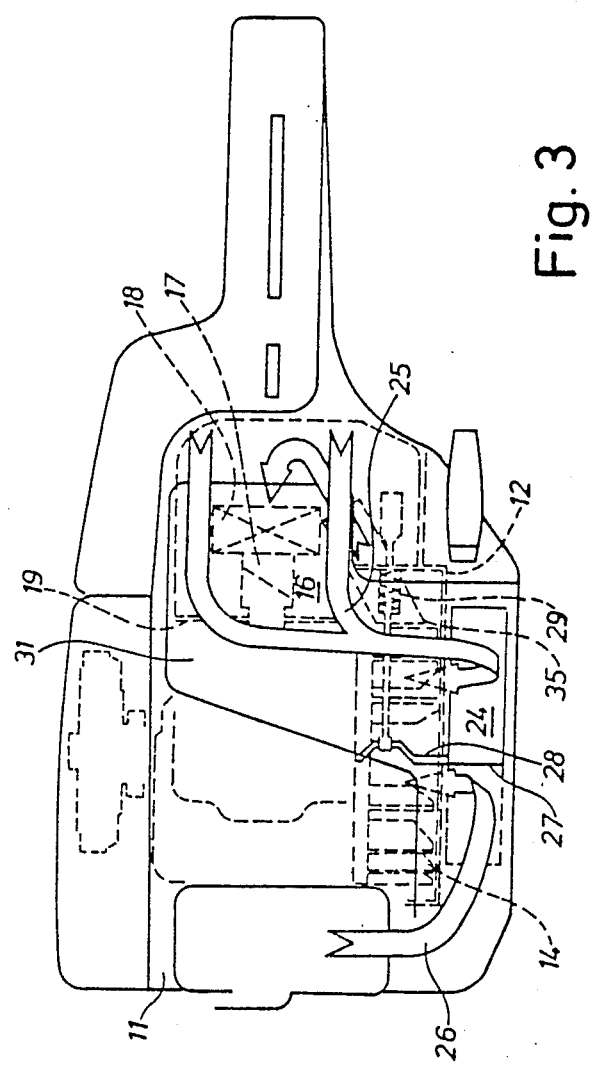

An embodiment of the arrangement according to the invention will now be described with reference to the accompanying drawings which show in FIG. 1 a vertical projection of a motor saw partly in cross section, in FIG. 2 a fan housing in a vertical projection and in FIG. 3 in a horizontal projection.

A motor saw with an air-cooled, one cylinder engine is shown in a view of the fly wheel side in FIG. 1. The cylinder 10 has cooling fins and is surrounded by a cover 11 which guides the cooling air from a fan housing 12 surrounding the fly wheel 13 of the engine. This wheel is in a usual way provided with fan vanes 14 which during rotation force an air stream out to the periphery of the fan housing and through an outlet 15 therefrom to a space within the cover 11. At the side of this space is a carburetor room 16 with a carburetor 17 and an air filter 18. An intervening wall 19 separates the two rooms but is provided with an aperture for an intake manifold 20 which connects the carburetor with the cylinder. The air filter is at least a layer of sponge plastics, porous paper, cloth of nylon, a net of steel threads or felt 21 fastened in a frame 22 and removable for cleaning. The rear wall of the carburetor room is a detachable lid 23 which can be opened when the filter is to be cleaned. There are also choke and gas controls belonging to the carburetor having throughpassing connections in one of the walls of the room. This is a conventional structure of a motor saw which is generally used in this art.

In the embodiment of the invention shown on the drawing the cooling system is provided with a mixing chamber 24 in which two air streams 25, 26 can be mixed in a proper ratio for achieving an optimal engine temperature. There is a shunt damper 27 in the chamber journalled on a shaft 28 and adjustable between two end positions by means of a temperature sensitive control device 29. The air stream 25 is outdoor air passing through an opening 30 in a separate portion of the top surface 31 of the engine housing into the mixing chamber. The air stream 26 is recirculating cooling air which, coming from the space inside the cover 11, passes by a silencer 32 and the cooling fins of the cylinder 10 on its way to the mixing chamber. The mixed air 33 flows through a port 34 between the chamber and the fan housing 12, wherefrom it is passed to the cylinder again as cooling air. A portion of the cooling air passes through outlets out from the space around the cylinder.

Due to the fact that a part of this clean cooling air mixed to a proper temperature is passed via a conduit 35 to the carburetor room 16 combustion air properly tempered to the working conditions of the engine is obtained. This air entering the carburetor room via a conduit 35 from the fan housing is drawn through the filter 18 before it is mixed to the combustion gas in the carburetor. Due to the position of the air inlet on the top of the saw the inlet of snow is prevented and thus the arrangement eliminates previous problems concerning frozen controls and a frozen air filter.

Owing to the combination of the air inlet and the mixing chamber with an air cleaning system based on the centrifugal effect of the fan wheel the aforesaid advantages are obtained simultaneously as the concentration of pollution on the filter is considerably reduced. The aforesaid conduit 35 between the fan housing and the carburetor room then includes, according to this publication, a dust separator which parcels out the predominating part of the pollutants and thus unburdens the filter 18. This is shown in FIG. 2 by a port 36 in the fan housing from which air is guided in a tube 37 to the carburetor room. The port is located outside the fan vanes 14, which strive to propel an air stream axially and approximately parallelly to the port. Particles in the air are carried by the stream substantially past the port, as their movement describes a roundabout way outside the port. The particles are forced away by the carrying speed effect of the fan and follow the cooling air out of the system.

The embodiment described is an example how to exercise the invention. Of course, there are more variations of the embodiment falling within the scope of the invention.

We claim:

1. An arrangement for the inlet of cooling and combustion air in a motor saw having a fan system, a cylinder and a carburetor, said arrangement comprising an external air inlet for admitting outdoor air to the saw, said external inlet comprising an opening in the top surface of the saw, said arrangement further comprising an internal air distributor for recirculating cooling air in said system, said distributor being positioned to receive outdoor air from said external inlet and air preheated by circulation about said cylinder and to supply mixed, preheated air to the input of the fan system, said fan system directing air received thereby either along one path to said carburetor or along another path to circulate about said cylinder.

2. The arrangement according to claim 1, wherein the distributor comprises a mixing chamber for receiving air from said inlet of outdoor air and air circulated about said cylinder.

3. The arrangement according to claim 2, comprising a shunt damper is disposed in the mixing chamber and controlled by a temperature sensitive control device in order to adjust the mixing ratio between outdoor air and recirculating inner air.

4. The arrangement according to claim 1, wherein a connecting conduit is positioned to direct air from the fan system to a carburetor compartment within which said carburetor is positioned.

5. The arrangement according to claim 4, wherein the fan system has a fly wheel with fan vanes, and a port in said connecting conduit is positioned near to the tops of the fan vanes.

6. The arrangement according to claim 5, wherein the flow direction of the connecting conduit in and immediately after the port is parallel to the moving direction of the fan vanes.

* * * * *